United States Patent
Choi

(10) Patent No.: US 9,437,157 B2
(45) Date of Patent: Sep. 6, 2016

(54) IMAGE PROCESSING APPARATUS AND IMAGE PROCESSING METHOD

(71) Applicant: LG Electronics Inc., Seoul (KR)

(72) Inventor: Sungha Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/258,745

(22) Filed: Apr. 22, 2014

(65) Prior Publication Data

US 2014/0225927 A1     Aug. 14, 2014

Related U.S. Application Data

(62) Division of application No. 13/218,389, filed on Aug. 25, 2011, now Pat. No. 8,743,143.

(60) Provisional application No. 61/467,699, filed on Mar. 25, 2011.

(51) Int. Cl.
   *G09G 5/00*   (2006.01)
   *G06F 3/14*   (2006.01)
   *B60K 35/00*  (2006.01)
   *G09G 5/377*  (2006.01)

(52) U.S. Cl.
   CPC ............ *G09G 5/005* (2013.01); *B60K 35/00* (2013.01); *G06F 3/1423* (2013.01); *G06F 3/1454* (2013.01); *G09G 5/377* (2013.01); *B60K 2350/1068* (2013.01); *B60K 2350/1096* (2013.01); *B60K 2350/352* (2013.01); *B60K 2350/355* (2013.01); *B60K 2350/357* (2013.01); *G09G 2320/0613* (2013.01); *G09G 2320/10* (2013.01); *G09G 2340/045* (2013.01); *G09G 2340/14* (2013.01); *G09G 2350/00* (2013.01)

(58) Field of Classification Search
   CPC .. G09G 5/005; G09G 5/377; G09G 2350/00; G09G 2340/045; G09G 2320/0613; G09G 2340/14; G09G 2320/10; G06F 3/1423; G06F 3/1454; B60K 35/00; B60K 2350/357; B60K 2350/1096; B60K 2350/355; B60K 2350/1068; B60K 2350/352
   See application file for complete search history.

(56) References Cited

U.S. PATENT DOCUMENTS

| 2007/0106437 A1 | 5/2007 | Kim et al. |
| 2011/0029239 A1 | 2/2011 | Okude et al. |
| 2011/0187547 A1* | 8/2011 | Kweon ......................... 340/670 |

FOREIGN PATENT DOCUMENTS

| JP | 2002-101452 A | 4/2002 |
| JP | 2010-130674 A | 6/2010 |
| JP | 2011-33460 A | 2/2011 |
| KR | 10-2005-0084632 A | 8/2005 |
| KR | 10-2007-0046401 A | 5/2007 |
| KR | 10-2009-0065324 A | 6/2009 |
| KR | 10-2011-0027246 A | 3/2011 |

* cited by examiner

*Primary Examiner* — Maurice L McDowell, Jr.
(74) *Attorney, Agent, or Firm* — Birch, Stewart, Kolasch & Birch, LLP

(57) ABSTRACT

A display system including a communication unit to receive streamed data from a mobile terminal located within the vehicle; a first display unit operatively connected to the communication unit and installed in a first location in the vehicle, the first display unit to display the streamed data; and a second display unit operatively connected to the communication unit and installed in a second location in the vehicle different than the first location, the second display unit to display the streamed data. Further, the first display unit interrupts the display of the streamed data by the first display unit while the mobile terminal processes an incoming or outgoing call, and the second display unit continues to display the streamed data while the mobile terminal processes the incoming or outgoing call.

8 Claims, 13 Drawing Sheets

(a)

(b)

(c)

(a)

(b)

(c)

(a)

(b)

(c)

(a)

(b)

IMAGE PROCESSING APPARATUS AND IMAGE PROCESSING METHOD

CROSS REFERENCE TO RELATED APPLICATIONS

This application is a divisional of co-pending U.S. patent application Ser. No. 13/218,389, filed on Aug. 25, 2011, which claims the benefit of U.S. Provisional Application No. 61/467,699, filed on Mar. 25, 2011. The contents of all of these applications are hereby incorporated by reference as fully set forth herein in their entirety.

BACKGROUND OF THE INVENTION

1. Field of the Invention

The present disclosure relates to an electronic device and, more particularly, to a method for processing images in an image display device mounted in a vehicle, and an image display device and a mobile terminal providing the same.

2. Description of the Related Art

An image display device has a function of outputting images for users to view. Users may view images in a vehicle through the image display device mounted in the vehicle. The image display device mounted in the vehicle is able to receive images from an external device such as a mobile terminal in the vehicle through a fixed line or wirelessly to allow a user to view the received images.

SUMMARY OF THE INVENTION

Accordingly, an aspect of the present disclosure provides an image display device capable of detecting image characteristic information from an image of a screen provided by a mobile terminal, extracting a characteristic area based on the image characteristic information, and automatically magnifying or reducing the extracted characteristic area and display the same, to thereby allow a user to conveniently and effectively view the image provided from the mobile terminal in a vehicle.

Another object of the present disclosure is to provide an image display device capable of changing an image subject to a travel regulation according to the speed of a vehicle, to thus allow the user not to be interfered with while driving.

To achieve these and other advantages and in accordance with the purpose of the present disclosure, as embodied and broadly described herein, an embodiment of the present disclosure provides in one aspect an image display device including: a communication unit configured to receive an image from a mobile terminal; a controller configured to detect image characteristic information of the received image, extract a first area on the basis of the detected image characteristic information, determine an image processing scheme with respect to the extracted first area, and process an image corresponding to the extracted first area according to the determined image processing scheme; and a display unit configured to display the processed image.

The controller may determine whether or not a state of the vehicle corresponds with travel regulation conditions, and when the state of the vehicle corresponds with the travel regulation conditions, the controller may process the image corresponding to the first area according to the determined image processing scheme.

When the image characteristic information corresponding to the extracted first area is a moving image (or a streaming moving image), the image processing scheme may be a scheme of magnifying or reducing the image corresponding to the first area.

When the image characteristic information corresponding to the extracted first area is a moving image, the image processing scheme may be a scheme of changing the image corresponding to the first area into an image having a predetermined resolution.

The image processing scheme may be a scheme of receiving an image which has been magnified or reduced to a predetermined size from the mobile terminal.

The image processing scheme may be a scheme of receiving an image changed to have predetermined resolution from the mobile terminal.

The image processing scheme may be a scheme of displaying a substitute image on a first area when the image characteristic information corresponding to the extracted first area is a moving image.

The image processing scheme may be a scheme of requesting a continuous transmission of the image corresponding to the first area and receiving the image corresponding to the request from the mobile terminal.

The image processing scheme may be a scheme of requesting an interruption of a transmission of an image corresponding to a second area except for the first area of the received image from the mobile terminal, storing the second area, and processing the image corresponding to the first area and an image corresponding to the stored second area so as to be displayed on the display unit.

When the image characteristic information corresponding to the extracted first area is text, the controller may extract the size of the text and compare the size of the text with a reference size, and when the size of the text is smaller than the reference size, the controller may provide control to magnify and display the first area.

To achieve these and other advantages and in accordance with the purpose of the present disclosure, as embodied and broadly described herein, an embodiment of the present disclosure provides in another aspect a mobile terminal including: a communication unit configured to receive an incoming call; and a controller configured to determine whether or not the mobile terminal has been connected to an image display device mounted in a vehicle according to the reception of the incoming call, and provide control to continuously execute an application which has been executed when the mobile terminal has been connected to the image display device mounted in the vehicle.

The controller may provide control to transmit a signal indicating that the incoming call has been received to the image display device mounted in the vehicle.

To achieve these and other advantages and in accordance with the purpose of the present disclosure, as embodied and broadly described herein, an embodiment of the present disclosure provides in another aspect an image display device mounted in a vehicle including: a communication unit configured to receive an image from a mobile terminal; a controller configured to determine whether or not an application corresponding to the received image is a travel regulation target; and a display unit configured to display an image substituting the received image when the application corresponding to the received image is a travel regulation target.

The controller may extract image characteristic information from the received image, and determine whether or not an application corresponding to the received image is a travel regulation target on the basis of the extracted image characteristic information and a classification model.

The controller may determine whether or not a state of the vehicle corresponds with travel regulation conditions, and the display unit may display an image replacing the received image, when the state of the vehicle corresponds with travel regulation conditions.

The travel regulation conditions may be that the speed of the vehicle is higher than a predetermined speed.

To achieve these and other advantages and in accordance with the purpose of the present disclosure, as embodied and broadly described herein, an embodiment of the present disclosure provides in another aspect a display method including: receiving an image from a mobile terminal; detecting image characteristic information of the received image; extracting a first area on the basis of the detected image characteristic information; determining an image processing scheme with respect to the extracted first area on the basis of the image characteristic information corresponding to the extracted first area; processing an image corresponding to the extracted first area on the basis of the determined image processing scheme; and displaying the processed image.

To achieve these and other advantages and in accordance with the purpose of the present disclosure, as embodied and broadly described herein, an embodiment of the present disclosure provides in another aspect a method for controlling a mobile terminal including: receiving an incoming call; determining whether or not the mobile terminal has been connected to an image display device mounted in the vehicle according to the reception of the incoming call; and when the mobile terminal has been connected to the image display device mounted in the vehicle, providing control to continuously execute an application which has been executed.

To achieve these and other advantages and in accordance with the purpose of the present disclosure, as embodied and broadly described herein, an embodiment of the present disclosure provides in another aspect a display method including: receiving an image from a mobile terminal; determining whether or not an application corresponding to the received image is a travel regulation target; and when the application corresponding to the received image is a travel regulation target; displaying an image replacing the received image.

The determining of whether or not the application corresponding to the received image is a travel regulation target may include: extracting image characteristic information from the received image; and determining whether or not the application corresponding to the received image is a travel regulation target on the basis of the extracted image characteristic information and a classification model.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE INVENTION

Reference will now be made in detail to the preferred embodiments of the present disclosure, examples of which are illustrated in the accompanying drawings. In the following description, usage of suffixes such as 'module', 'part' or 'unit' used for referring to elements is given merely to facilitate explanation of the present disclosure, without having any significant meaning by itself.

The present disclosure will now be described more fully hereinafter with reference to the accompanying drawings, in which preferred embodiments of the invention are shown. This invention may, however, be embodied in many different forms and should not be construed as being limited to the embodiments set forth herein.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning or as having an excessively contracted meaning. If technical terms used herein is erroneous that fails to accurately express the technical idea of the present disclosure, erroneous terms should be replaced with technical terms that allow the person in the art to properly understand. The general terms used herein should be interpreted according to the definitions in the dictionary or in the context and should not be interpreted as an excessively contracted meaning.

Image Transmission System

Figure 1:
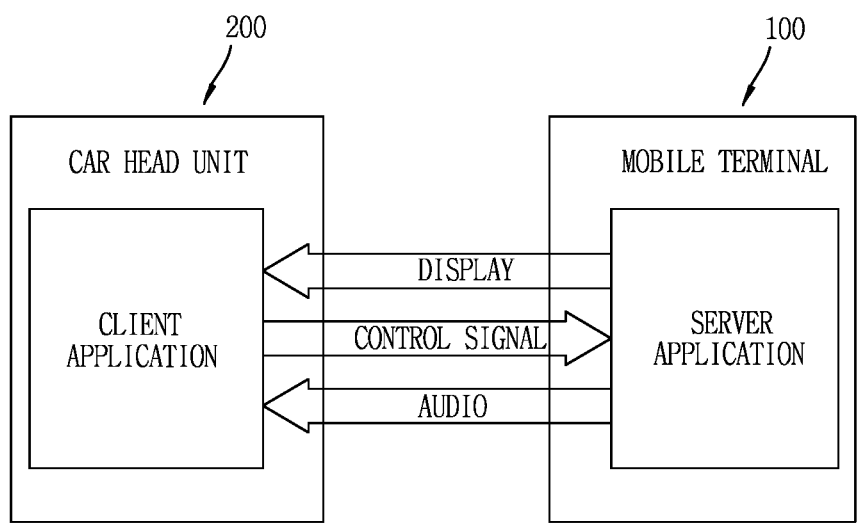
FIG. 1 is a view schematically showing an example of an image transmission system including a mobile terminal and an image display device according to an exemplary embodiment of the present disclosure.

FIG. 1 is a view schematically showing an example of an image transmission system including a mobile terminal and an image display device according to an exemplary embodiment of the present disclosure.

As shown in FIG. 1, the image transmission system according to an exemplary embodiment of the present disclosure includes a mobile terminal 100 and an image display device 200.

The mobile terminal 100 may be connected to the image display device 200 through a fixed line or wirelessly to transmit at least one of an image and a voice to the image display device 200.

The image display device 200 may be mounted in a vehicle in a fixed manner, and may be connected to the mobile terminal 100 through a fixed line or wirelessly to receive at least one of an image and a voice from the mobile terminal. Also, the image display device 200 may output at least one of the image and voice which has been received from the mobile terminal.

The image display device 200 may receive a user input and transmit the received input to the mobile terminal 100. For example, when the user applies a touch input through a touch screen provided to the image display device 200, a position of a point to which the touch input has been applied in the image is recognized, the information regarding the recognized position may be transmitted to the mobile terminal 100.

Then, the mobile terminal 100 may determine that a touch event has occurred at the point at which the touch input has been applied, and may perform an operation corresponding to the generated touch event. Namely, the user may control the operation of the mobile terminal 100 by using a touch screen, a hard key, or the like provided to the image display device 200.

In an embodiment of the image transmission system, the user may execute a road guide application (or dialing, a phone book, an e-mail, a moving image play application, and the like) installed in the mobile terminal 100 and the mobile terminal transmits an executed image of the road guide application to the image display device 200 so that the executed image of the road guide application can be displayed on the image display device 200.

The user can view the executed image of the road guide application on a large screen of the image display device 200 in the place of a small screen of the mobile terminal 100. Also, the user can listen to a road guide voice through a speaker provided to the vehicle in the place of a speaker of the mobile terminal 100.

Also, when the user selects a menu related to the road guide by using a touch screen or a hard key provided to the image display device 200, an operation with respect to the corresponding menu can be performed on the mobile terminal 100. The mobile terminal may transmit the results of performing the operation with respect to the corresponding menu to the image display device 200 so that the image display device 200 can output the same.

The mobile terminal 100 and the image display device 200 may be connected by using a short-distance communication standard such as Bluetooth™, or the like, a wireless Internet standard such as Wi-Fi, or the like, an external device interface standard, such as USB (Universal Serial Bus), or the like.

Also, a server application providing a service may be installed in the mobile terminal 100 and a client application allowing for a connection to a service provided by the server may be installed in the image display device 200 according to a client's request.

The server application of the mobile terminal 100 may capture an image of the screen of the mobile terminal regardless of an application type of the mobile terminal 100 and transmit the captured image to the client application of the image display device 200. Also, the server application controls the operation of the mobile terminal 100 on the basis of information regarding an event generated in the image display device 200 from the client application.

For example, the image display device 200 may remotely control the mobile terminal 100 according to a VNC (Virtual Network Computing) scheme using an RFB (Remote Frame Buffer) protocol providing a remote access to a graphic user interface. According to the VNC scheme, while the mobile terminal 100 is transferring screen update to the image display device, an input event generated by the image display device 200 is transmitted to the mobile terminal 100.

Also, the mobile terminal 100 may transit a voice to the image display device 200, a headset, a hands free, or the like, according to, for example, an A2DP (Advanced Audio Distribution Profile) defining sound quality of an audio (stereo or mono) signal or output which can be streamed from a first device to a second device, an HSP (HeadSet Profile) regarding a Bluetooth headset, an HFP (HandsFree Profile) applied to a vehicle hands free kit, or the like.

Meanwhile, the mobile terminal 100 and the image display device 200 may exchange supplementary information on the basis of a protocol. For example, the image display device 200 may provide vehicle status information such as vehicle travel information, speed information, fuel information, or the like, to the mobile terminal 100.

Some applications installed in the mobile terminal 100 may use the vehicle status information received from the image display device 200 by using a protocol. Also, the applications may provide information regarding the type of applications (e.g., a road guidance, multimedia, games, and the like), the type of a GUI (Graphic User Interface), the status of an application (e.g., whether or not an application is being executed at a foreground or a background), or the like.

Mobile Terminal

Figure 2:
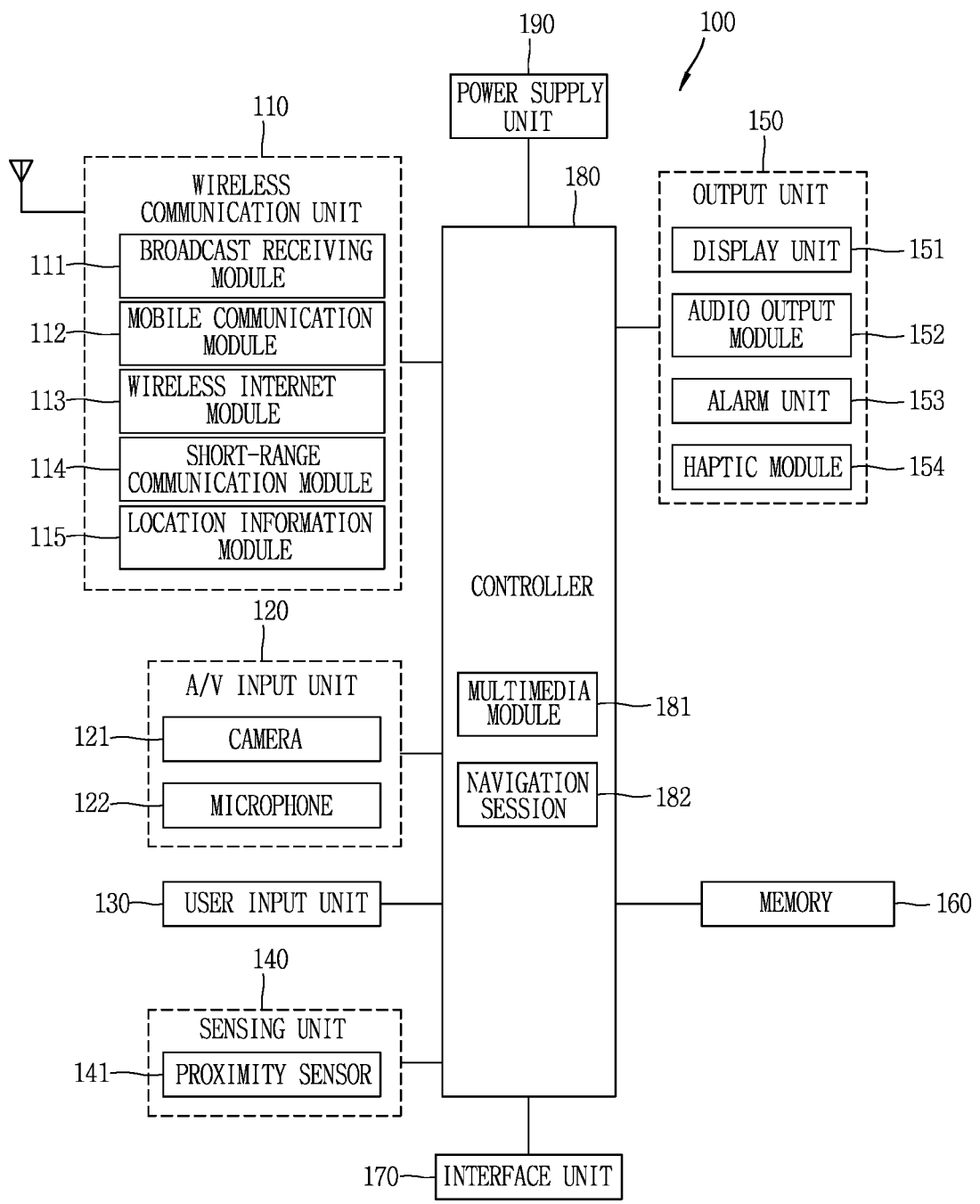
FIG. 2 is a schematic block diagram showing the configuration of a mobile terminal according to an exemplary embodiment of the present disclosure.

FIG. 2 is a schematic block diagram showing the configuration of a mobile terminal according to an exemplary embodiment of the present disclosure. The mobile terminal 100 may be implemented in various forms. For example, the mobile terminal may include mobile phones, smartphones, notebook computers, digital broadcast terminals, PDAs (Personal Digital Assistants), PMPs (Portable Multimedia Player), etc.

As shown in FIG. 2, the mobile terminal 100 may include a wireless communication unit 110, an A/V (Audio/Moving image) input unit 120, a user input unit 130, a sensing unit 140, an output unit 150, a memory 160, an interface unit 170, a controller 180, and a power supply unit 190, etc. The components as shown in FIG. 1 are not a requirement, and greater or fewer components may alternatively be implemented.

The wireless communication unit 110 may include one or more components allowing the mobile terminal 100 and a wireless communication system to perform radio communication or the mobile terminal 100 and a network in which the mobile terminal 100 is located to perform radio communication. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, broadcast signal may exist in the form of an electronic program guide (EPG) of digital multimedia broadcasting (DMB), electronic service guide (ESG) of digital moving image broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital moving image broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a moving image call signal or various types of data according to text and/or multimedia message transmission and/or reception.

The wireless Internet module 113 supports wireless Internet or other network access for the mobile terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, Wireless LAN, and the like.

The location information module 115 is a module for checking or acquiring a location (or position) of the mobile terminal. For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or hybrid positioning system may be used.

The A/V input unit 120 is configured to receive an audio or moving image signal. The A/V input unit 120 may include a camera 121 (or other image capture device) and a microphone 122 (or other sound pick-up device). The camera 121 processes image data of still pictures or moving image obtained by an image capture device in a moving image capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, the display unit 151 may be called a touch screen.

The sensing unit 140 (or other detection device) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection device) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, moving image I/O ports, earphone ports, or the like. Here, the identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection device. The interface unit 170 may be used to receive inputs (e.g., data, information, power, etc.) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, moving image signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a moving image call mode or image capturing mode, the display unit 151 may display a captured image and/or received image, a UI or GUI that shows moving images or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display device) according to its particular desired embodiment. For example, the mobile terminal may include both an external display unit (not shown) and an internal display unit (not shown).

Meanwhile, when the display unit 151 and the touch pad are overlaid in a layered manner to form a touch screen, the display unit 151 may function as both an input device and an output device. The touch sensor may have the form of, for example, a touch film, a touch sheet, a touch pad, and the like.

Also, the touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and the proximity sensor 141 can be utilized for various purposes.

The proximity sensor 141 may include, for example, a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, proximity touch means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to moving image or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration device. Or, when a key signal is inputted, the alarm unit 153 may vibrate the mobile terminal 100 through a vibration device as a feedback with respect to the key signal input. Through the vibration, the user may recognize the occurrence of an event. A signal for notifying about the occurrence of an event may be output to the display unit 151 or to the voice output module 152.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, moving image, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, moving image I/O ports, earphone ports, or the like. Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied there through to the mobile terminal 100 or may serve as a passage to allow various command signals inputted by the user from the cradle to be transferred to the mobile terminal there through. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, moving image calls, and the like. The controller 180 may include a multimedia module 181 for reproducing multimedia data. The multimedia module 181 may be configured within the controller 180 or may be configured to be separated from the controller 180. The controller 180 may also include a navigation session 182 for controlling navigation functions, as discussed below relative to FIG. 3.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Image Display Device

Figure 3:
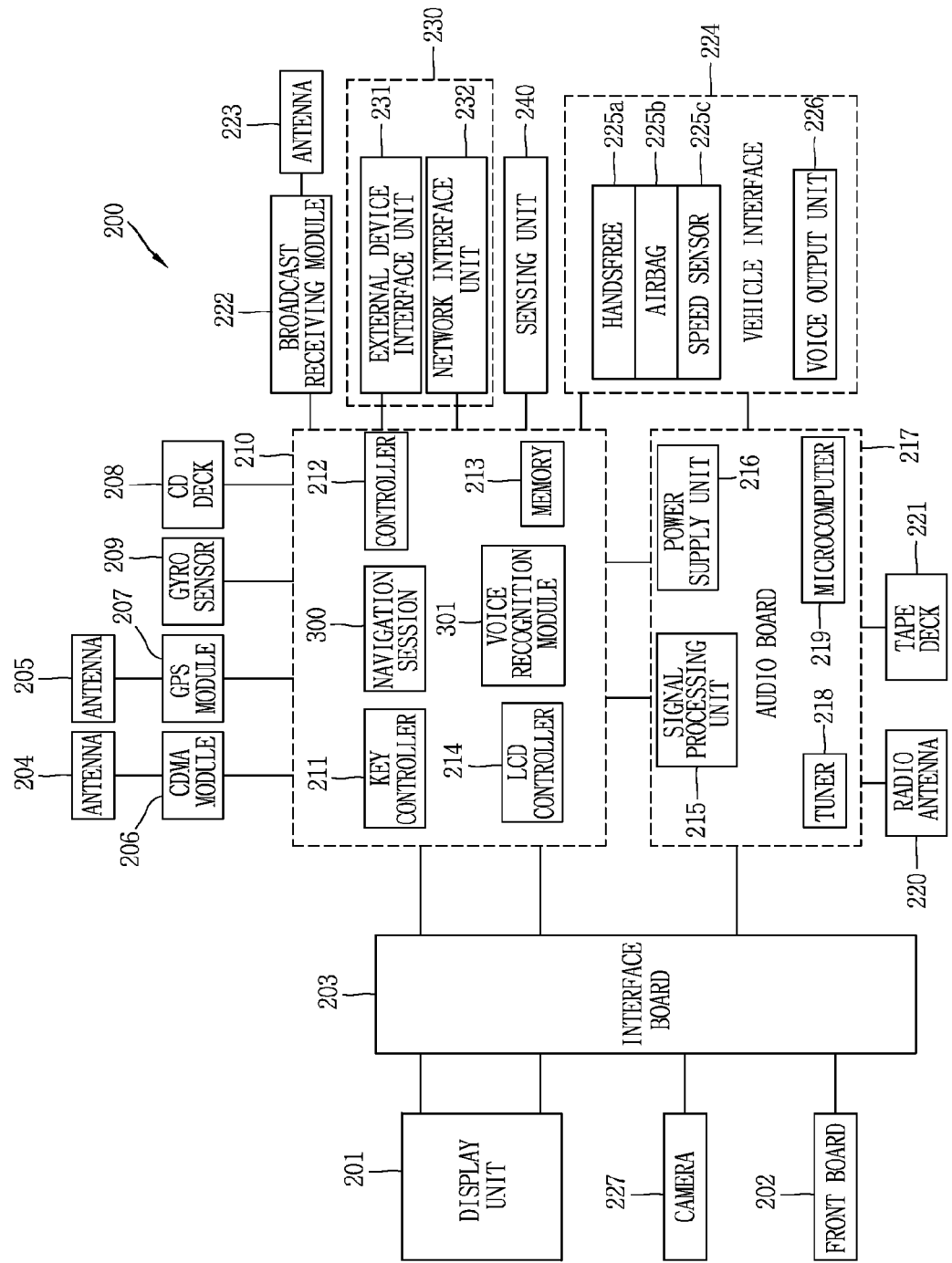
FIG. 3 is a block diagram showing an image display device according to an exemplary embodiment of the present disclosure.

FIG. 3 is a block diagram showing the image display device 200 according to an exemplary embodiment of the present disclosure.

As shown in FIG. 3, the image display device 200 includes a main board 210 including a CPU (Central Processing Unit) 212 for controlling a general operation of the image display device 200, a memory 213 for storing a processing and controlling program and input and output data, a key controller 211 for controlling various key signals, and an LCD controller 214 for controlling an LCD.

The memory 213 stores map information (map data) for displaying road guidance information on a digital map. Also, the memory 213 stores a traffic information collecting control algorithm for inputting traffic information according to the situation of a road along which the vehicle currently travels (runs), and information for controlling the algorithm.

The main board 210 includes or interfaces with a CDMA module 206, having a unique device number assigned to a mobile terminal installed in a vehicle, a GPS module 207 for guiding the location of the vehicle, receiving a GPS signal for tracking a travel route from a start point to a destination, or transmitting traffic information collected by the user as a GPS signal, a CD deck 208 for reproducing a signal recorded in a CD (Compact Disk), a gyro sensor 209, or the like. The CDMA module 206 and the GPS module 207 receive signals via antennas 204 and 205.

A broadcast receiving module 222 may be connected with the main board 210 and receive a broadcast signal via an antenna 223. A display unit (i.e., an LCD) 201 under the control of the LCD controller 214, a front board 202 under the control of the key controller 211, and a camera 227 for capturing images of the interior and/or the exterior of the vehicle are connected to the main board 210 via an interface board 203. The display unit 201 displays various moving image signals and character signals, and the front board 202 includes buttons for various key signal inputs and provides a key signal corresponding to a button selected by the user to the main board 210. Also, the display unit 201 includes a proximity sensor and a touch sensor (touch screen) of FIG. 2.

The front board 202 includes a menu key for directly inputting traffic information. The menu key may be configured to be controlled by the key controller 211.

The audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219, and a signal processing unit 215 for processing various voice signals.

The audio board 217 also includes a radio antenna 220 for receiving a radio signal and a tape deck 221 for reproducing an audio tape. The audio board 217 may further include a voice output unit (e.g., an amplifier) 226 for outputting a voice signal processed by the audio board 217.

The voice output unit (amplifier) 226 is connected to a vehicle interface 224. Namely, the audio board 217 and the main board 210 are connected to the vehicle interface 224. A hands free 225a for inputting a voice signal, an airbag 225b configured for the security of a passenger, a speed sensor 225c for detecting the speed of the vehicle, or the like, may be connected to the vehicle interface 224. The speed sensor 225c calculates a vehicle speed and provides the calculated vehicle speed information to the CPU 212.

The navigation session 300 applied to the image display device 200 generates road guidance information based on the map data and current location information of the vehicle and provides the generated road guidance information to the user.

The display unit 201 detects a proximity touch within a display window via a proximity sensor. For example, when a pointer (e.g., user's finger or stylus) is proximity-touched, the display unit 201 detects the position of the proximity touch and outputs position information corresponding to the detected position to the controller 212.

A voice recognition device (or a voice recognition module) 301 recognizes a voice pronounced by the user and performs a corresponding function according to the recognized voice signal.

The navigation session 300 applied to the image display device 200 displays a travel route on the map data, and when the mobile terminal 100 is located within a pre-set distance from a blind spot included in the travel route, the navigation session 300 automatically forms a wireless network together with a terminal (e.g., a vehicle navigation apparatus) mounted in a nearby vehicle or a mobile communication terminal carried around by a nearby pedestrian via radio communication (e.g., a short-range wireless communication network) to receive location information of a nearby vehicle from the terminal mounted in the nearby vehicle and receive location information of the nearby pedestrian from the mobile communication terminal carried around by the nearby pedestrian.

Meanwhile, the main board may be connected to the interface unit 230. The interface unit 230 includes an external device interface unit 231 and a network interface 232.

The external device interface unit 231 may connect an external device and the image display device 200. To this end, the external device interface unit 231 may include an A/V input/output unit (not shown) or a wireless communication unit (not shown).

The external device interface unit 231 may be connected to an external device such as a DVD (Digital Versatile Disk), Blu-ray, a game machine, a camera, a camcorder, a computer (or a notebook computer), and the like, through a fixed line or wirelessly. The external device interface unit 231 may deliver an image, voice, or data signal input from the exterior through the connected external device to the controller 212 of the image display device 200. Also, the external device interface unit 231 may output the image, voice, or data signal processed by the controller 212 to the connected external device. To this end, the external device interface unit 231 may include an A/V output unit (not shown) or a wireless communication unit (not shown).

The A/V input/output unit may include a USB terminal, a CVBS (Composite Moving image Banking Sync) terminal, a component terminal, an S-moving image terminal (analog), a DVI (Digital Visual Interface) terminal, an HDMI (High Definition Multimedia Interface) terminal, an RGB terminal, a D-SUB terminal, or the like, in order to input the image and voice signal of the external device to the image display device 200.

The wireless communication unit may perform short-range radio communication with a different electronic device. The image display device 200 may be connected to the different electronic device by a network according to a communication standard such as Bluetooth™, RFID (Radio Frequency Identification), IrDA (Infrared Data Association), UWB (Ultra Wideband), ZigBee™, DLNA (Digital Living Network Alliance), or the like.

Also, the external device interface unit 231 may be connected to various set-top boxes (STB) through at least one of and various terminals to perform an input or output operation with the STB.

Meanwhile, the external device interface unit 231 may receive an application or an application list from an adjacent external device and transfer the same to the controller 212 or the memory 213.

The network interface unit 232 provides an interface for connecting the image display device 200 to a wired/wireless network including the Internet. The network interface unit 232 may include, for example, an Ethernet terminal for a connection with the wired network, and may use a communication standard such as a wireless local area network (WLAN), wireless broadband (WiBro), world interoperability for microwave access (WiMAX), high speed downlink packet access (HSDPA), and the like, for a connection with the wireless network.

The network interface unit 232 may transmit or receive data to or from a different user or a different electronic device through a connected network or a different network linked to the connected network. In particular, a portion of contents data stored in the image display device 200 may be transmitted to a user or an electronic device selected from among different users or different electronic devices registered to the image display device 200.

Meanwhile, the network interface unit 232 may be connected to a certain web page through a connected network or a different network linked to the connected network. Namely, the network interface unit 232 may be connected to a certain Web page through a network to transmit or receive data to or from the corresponding server. Besides, the network interface unit 232 may receive contents or data provided by a contents provider or a network operator. Namely, the network interface unit 232 may receive contents such as movie, advertisements, games, VOID, a broadcast signal, or the like, provided from the contents provider or the network provider, and relevant information. Also, the network interface unit 232 may receive update information and an update file of firmware provided by a network operator. Also, the network interface unit 232 may transmit data to the contents provider or the network operator via the Internet.

Also, the network interface unit 232 may selectively receive an application among applications open to the public through a network.

Figure 4A:
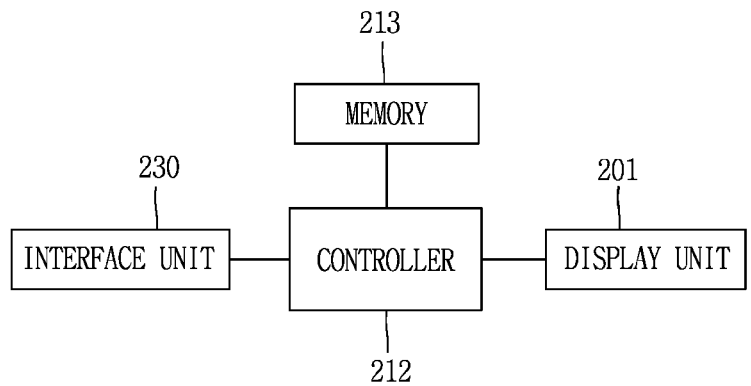
FIG. 4A is a schematic block diagram of the image display device according to an exemplary embodiment of the present disclosure.

FIG. 4A is a schematic block diagram of the image display device according to an exemplary embodiment of the present disclosure.

As shown in FIG. 4A, the image display device 200 may include a controller 212, an interface unit 230, a display unit 201, or the like. Also, the image display device 200 may further include a memory 213. The components illustrated in FIG. 4A are illustrated for the sake of convenience of explanation, and the plurality of components illustrated in FIG. 3 may correspond to one of the components illustrated in FIG. 4A, and the function of one component illustrated in FIG. 3 may be separated to be implemented in the components illustrated in FIG. 4.

Also, all the components of the image display device 200 illustrated in FIG. 4A are not essential, and the image display device may be implemented by more components or less components than those illustrated in FIG. 4A.

The controller 212 performs various functions according to an exemplary embodiment of the present disclosure. In an exemplary embodiment of the present disclosure, the controller 212 basically controls the display unit 201 to display an image received by the interface unit 230.

Also, in an exemplary embodiment of the present disclosure, the controller 212 may serve to detect image characteristic information from the received image. Also, the controller 212 may extract a particular area on the basis of the detected image characteristic information. Hereinafter, the extracted particular area will be referred to as a first area. The image characteristic information may be a moving image, a still image, or text.

In an exemplary embodiment of the present disclosure, the controller 212 may determine an image processing scheme with respect to the first area. Determining of the image processing scheme by the controller 212 may mean that the controller 212 applies a predetermined image processing scheme. Thus, determining the image processing scheme by the controller 212 and processing the first area accordingly may mean that the controller 212 processes the first area on the basis of the predetermined image processing scheme.

Also, in an exemplary embodiment of the present disclosure, the image processing scheme may be a scaling scheme with respect to a display size of the extracted area. For example, the scaling scheme may be a scheme of magnifying or reducing the first area to have a certain size. The certain size may be a predetermined size or may be determined according to an operator's selection (or a user selection).

Also, in an exemplary embodiment of the present disclosure, the image processing scheme may be a scheme of changing the resolution of an image corresponding to the extracted area. For example, when the image corresponding to the extracted area is magnified, the controller 212 may increase the resolution to better the picture quality of the image.

Also, in an exemplary embodiment of the present disclosure, the image processing scheme may be a scheme of processing the image with respect to the first area while the image display device 200 is communicating with the mobile terminal 100. For example, the image display device 200 may receive a scaled-up or scaled-down image from the mobile terminal and display the received image on the display unit 201.

Also, in an exemplary embodiment of the present disclosure, the image processing scheme may be a scheme of receiving only the image with respect to the first area of the entire area from the mobile terminal 100 and display the received image. For example, when the image characteristic information is a moving image, only an image corresponding to the first area of the entire area is received to reduce network traffic. The receiving of only the image corresponding to the first area of the entire area may be implemented by requesting the mobile terminal 100 to stop transmission of the other area than the first area. Here, the area other than the first area will be referred to as a second area.

Also, in an exemplary embodiment of the present disclosure, the image processing scheme may be a scheme of replacing the image with respect to the first area with a substitute image. For example, when the status of the vehicle corresponds with travel regulation conditions, the image with respect to the first area may be changed into a substitute image. This may be to lock out a display image with respect to the first area in order to prevent the driver from running when the status of the vehicle corresponds with the travel regulation conditions. For example, the travel regulation conditions may be that the status of the vehicle is a predetermined speed or faster. For example, the predetermined speed may be five miles (8 kilometers) an hour.

Also, in an exemplary embodiment of the present disclosure, the image processing scheme may be a scheme of extracting the size of text, when the image characteristic information is text, comparing the extracted size with a reference size, and magnifying or reducing the first area on the basis of the comparison results to display the magnified or reduced first area. Also, the controller 212 may process the first area on the basis of the determined image processing scheme. Various image processing schemes and travel regulation conditions are applied to an embodiment of the present disclosure.

The interface unit 230 may serve to communicate with an external device. For example, the external device may be the mobile terminal 100 connected to the image display device 200 wirelessly or through a fixed line. The communication unit 100 may receive an image corresponding to a certain application from the mobile terminal 100. The received image may include a moving image, a still image, text, or the like.

Also, the interface unit 230 may transmit a certain control signal generated by the controller to the mobile terminal 100. For example, the certain control signal may be a control signal for requesting an image obtained by magnifying or reducing the first image to a predetermined size.

The display unit 201 may serve to display the image received by the interface unit 230. Also, the controller 212 may display the image stored in the memory 213. The display unit 201 is controlled by the controller 212.

The memory 213 may serve to store the image received by the interface unit 230.

Also, the memory 213 may store the image processed on the basis of the image processing scheme by the controller 212. For example, the memory 213 may store image corresponding to the second area, which has been requested to be stopped, in the received image.

Figure 4B:
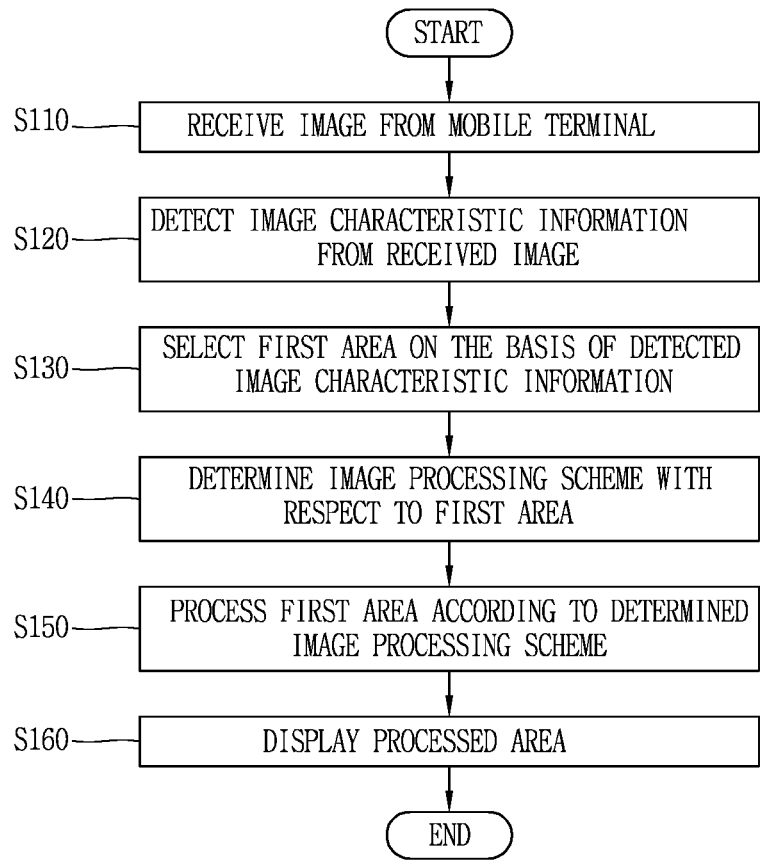
FIG. 4B is a flow chart illustrating the process of controlling an operation of the image display device according to an exemplary embodiment of the present disclosure.

FIG. 4B is a flow chart illustrating the process of controlling an operation of the image display device according to an exemplary embodiment of the present disclosure. The method of FIG. 4B may be performed by the devices shown in FIGS. 1-4A.

The interface unit 230 may receive an image from the mobile terminal 100 connected to the image display device 200 wirelessly or through a fixed line (S 110). For example, the interface unit 230 may receive a frame buffer including values with respect to all the pixels to be displayed on the screen of the mobile terminal 100 from the mobile terminal 100.

The image may be an image corresponding to the screen of the mobile terminal 100. For example, the image may be a standby screen image or a locked screen image of the mobile terminal, an image corresponding to an application being executed in the mobile terminal 100, or the like.

The controller 212 may detect image characteristic information from the received image (S120). Also, the controller 212 may extract a first area on the basis of the detected image characteristic information (S130). For example, the image characteristic information may be a moving image, a still image, text, or the like.

In an exemplary embodiment of the present disclosure, the image characteristic information may be a moving image. In this case, there may be various methods for detecting the moving image area.

Also, in an exemplary embodiment of the present disclosure, the controller 212 may detect a variation between a previously received image and a currently received image, and compare the variation with a threshold variation. When the variation of the received image is greater than the threshold variation, the controller 212 may determine that the image is a moving image.

Also, in an exemplary embodiment of the present disclosure, the controller 212 may use a motion vector in order to determine whether or not the received image is a moving image. The motion vector is to estimate a motion of a moving image signal. As a general method for detecting the motion vector, there is a block matching algorithm, in which an image signal is divided into blocks having a certain size, and then a vector having the difference of a minimum average absolute value corresponding to each block or having a minimum average square error value is obtained. Various other moving image detection methods can be applied to an embodiment of the present disclosure.

The controller 212 may determine an image processing scheme with respect to the first area (step S140). The determining of the image processing scheme by the controller 212 may mean that the controller 212 applies a predetermined image processing scheme.

In an exemplary embodiment of the present disclosure, the image processing scheme may be a scaling scheme with respect to a display size of the extracted area.

Also, in an exemplary embodiment of the present disclosure, the image processing scheme may be a scheme of processing an image with respect to the first area while the image display device 200 is communicating with the mobile terminal 100.

Also, in an exemplary embodiment of the present disclosure, the image processing scheme may be a scheme of receiving only the image with respect to the first area of the entire area from the mobile terminal 100 and display the received image.

Also, in an exemplary embodiment of the present disclosure, the image processing scheme may be a scheme of replacing the image with respect to the first area with a substitute image.

Also, in an exemplary embodiment of the present disclosure, the image processing scheme may be a scheme of extracting the size of text, when the image characteristic information is text, comparing the extracted size with a reference size, and magnifying or reducing the first area on the basis of the comparison results to display the magnified or reduced first area. Various image processing schemes and travel regulation conditions are applied to an embodiment of the present disclosure.

The controller 212 may process the extracted first area on the basis of the determined image processing scheme (step S150). In an exemplary embodiment, the controller 212 may determine whether or not a current status of the vehicle corresponds with the travel regulation conditions, and determine whether to process the extracted first area on the basis of the determined image processing scheme. For example, the controller 212 may magnify and display the first area until when the speed of the vehicle is 5 miles an hour or greater.

Also, in an exemplary embodiment of the present disclosure, the controller 212 may provide guide information to allow the driver of the vehicle to select whether to process the extracted first area on the basis of the determined image processing scheme. For example, the guide information may be voice information. Also, the guide information may be provided through various UIs (User Interfaces).

The controller 212 may control the display unit 201 to display the processed first area (step S140). In an exemplary embodiment of the present disclosure, the guide information may be displayed on the display unit 201 or may be output by voice.

First Embodiment

Figure 5A:
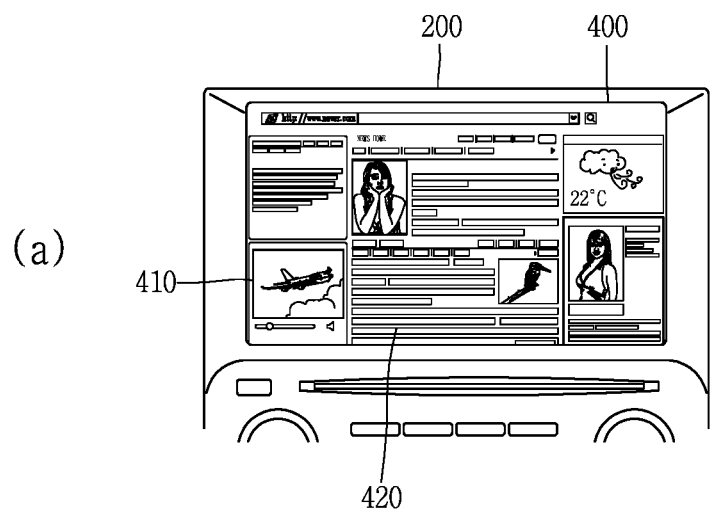
FIG. 5A is a view showing the process of controlling an operation of the image display device according to a first exemplary embodiment of the present disclosure.
Figure 5A:
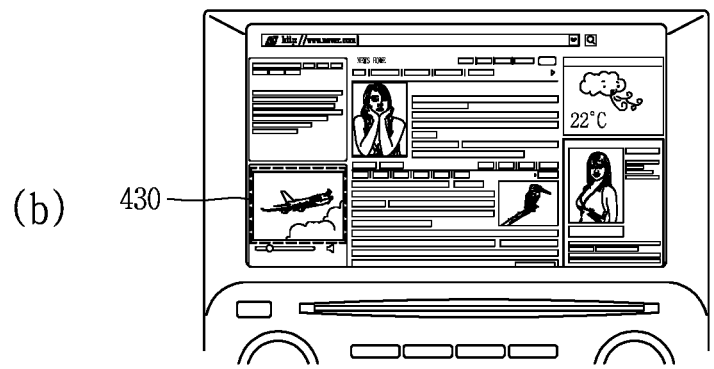
Figure 5A:

FIG. 5A is a view showing the process of controlling an operation of the image display device according to a first exemplary embodiment of the present disclosure.

With reference to FIG. 5A, an image (the entire area 400) received from the mobile terminal 100 is displayed by the image display device 200 (See FIG. 5A(a)). The received image (the entire area 400) may include image characteristic information. The image characteristic information may be a moving image, a still image, text, or the like. The received image (the entire area 400) in FIG. 5A includes a moving image area (a first area 410) and a still image area (a second area 420).

The controller 212 may detect the area (first area 410), including the moving image, from the entire area 400. The extracted first area 430 is illustrated in FIG. 5A(b). The moving image, whose images changes over time, may be detected through various methods.

In the first exemplary embodiment of the present disclosure, the controller 212 may detect a variation between a previously received image and a currently received image, and compare the variation with a threshold variation. When the variation of the received image is greater than the threshold variation, the controller 212 may determine that the image is a moving image. Various moving image detection methods may be applicable to the first embodiment of the present disclosure.

The controller 212 may determine an image processing scheme with respect to the extracted area as described above. In FIG. 5A(a), the image processing scheme is a scheme for magnifying the first area 410 to have a predetermined size and for displaying the same. A portion of an area (second area 420), excluding the moving image part, may not be displayed on the screen due to the magnified first area 410.

In the first exemplary embodiment of the present disclosure, the image processing scheme may be a scheme of magnifying the first area 410 to have a predetermined size and changing the resolution of the image corresponding to the extracted area.

In the first exemplary embodiment of the present disclosure, the processing of the first area 410 on the basis of the image processing scheme may be performed only when the current status of the vehicle corresponds with the travel regulation conditions. For example, the travel regulation conditions may be a case in which a current speed of the vehicle corresponds to a predetermined speed or faster. The travel regulation conditions may aim at preventing the driver from being interfered with while he is driving.

In the first exemplary embodiment of the present disclosure, the controller 212 may provide guide information to allow the operator (or the user) to determine whether to execute the image processing scheme in applying the image processing scheme. For example, the guide information may be provided through a UI. Also, the guide information may be output by voice by the image display device 200.

Also, in the first exemplary embodiment of the present disclosure, the image display device 200 may receive an image obtained by magnifying the first area 410 from the mobile terminal 100. For example, the controller 212 may detect the first area 410 including the moving image and transmit a control signal for requesting an image obtained by magnifying the first area 410 to the mobile terminal 100. When the mobile terminal 100 transmits an image obtained by magnifying the first area 410 to have a predetermined resolution in response to the control signal, the image display device 200 may receive the image through the interface unit 230. When the image display device 200 receives the magnified image with respect to the first area 410 from the mobile terminal 100, the image display device 200 may display an image having better picture quality.

Figure 5B:
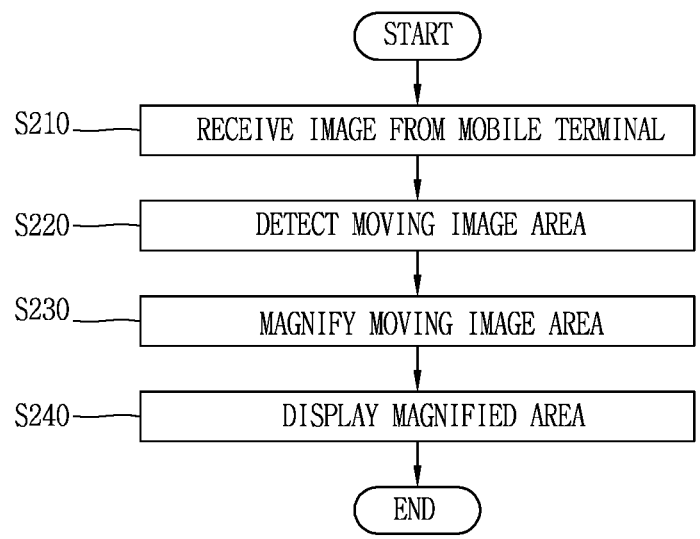
FIGS. 5B and 5C are flow charts illustrating the process of controlling an operation of the image display device according to the first exemplary embodiment of the present disclosure.
Figure 5C:
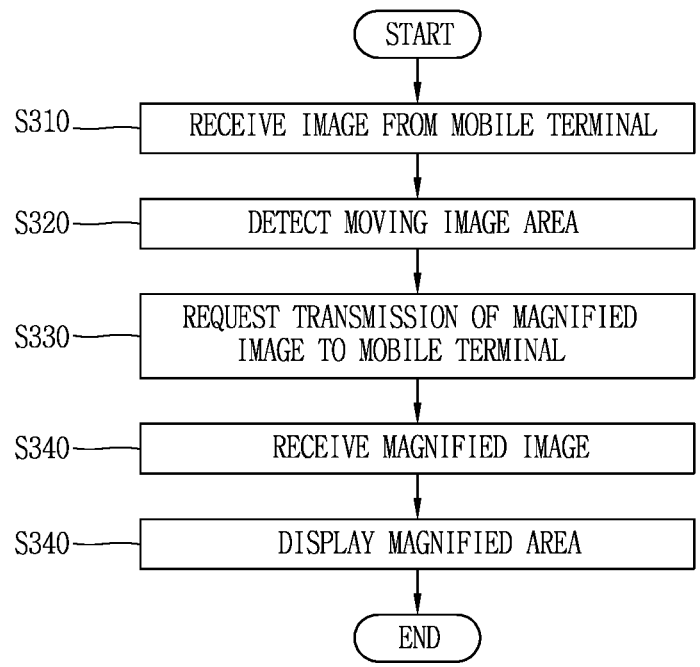

FIGS. 5B and 5C are flow charts illustrating the process of controlling an operation of the image display device according to the first exemplary embodiment of the present disclosure. The methods of FIGS. 5B and 5C may be performed by the devices shown in FIGS. 1-4A.

With reference to FIG. 5B, the interface unit 230 may receive an image from the mobile terminal 100 (step S210). The controller 212 may detect an area (first area 410) including a moving image from the received image (step S220). Also, the controller 212 may magnify the first area 410 (step S230). The display unit 201 may display the magnified image (step S240).

With reference to FIG. 5C, the image display device 200 may receive an image from the mobile terminal 100 through the interface unit 230 (step S310). The controller 212 may detect the area (first area 410) including the moving image from the received image (step S320). Also, the controller 212 may request the mobile terminal to transmit an image obtained by magnifying the first area 410 to have a predetermined resolution (step S330). When the mobile terminal 100 transmits the image which has been magnified to have a predetermined resolution in response to the request, the image display device 200 may receive the magnified image through the interface unit 230 (step S340). The display unit 201 may display the received image (step S350).

Second Embodiment

Figure 6:
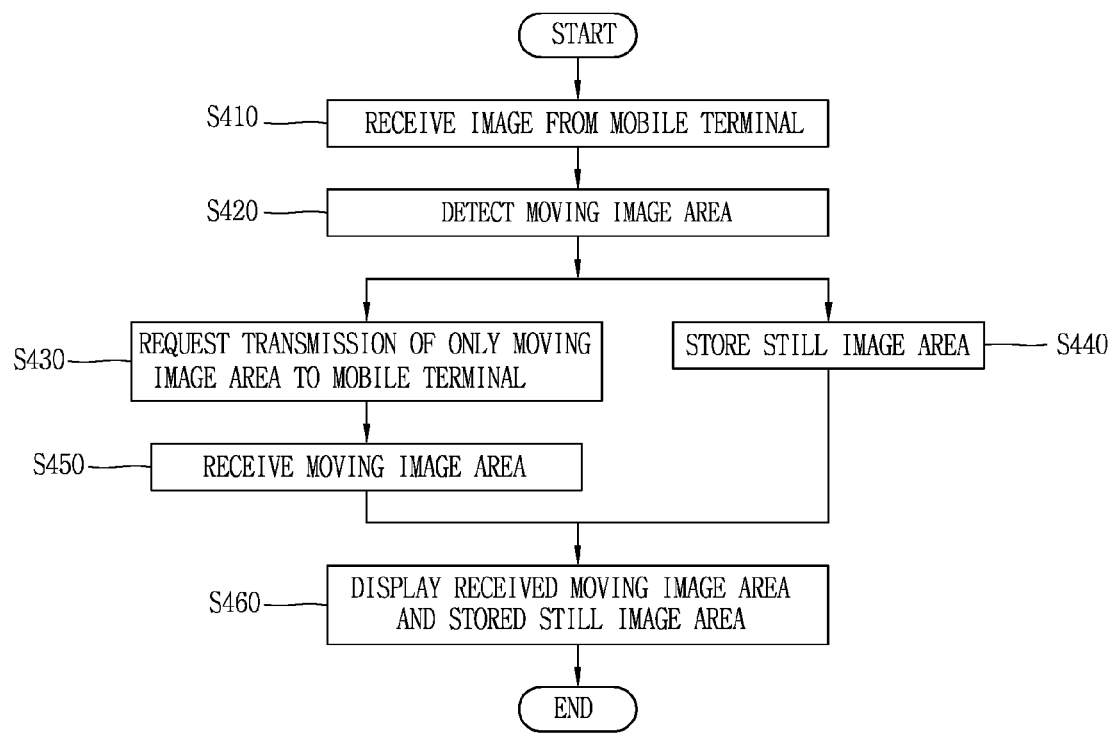
FIG. 6 is a flow chart illustrating the process of controlling an operation of the image display device according to a second exemplary embodiment of the present disclosure.

FIG. 6 is a flow chart illustrating the process of controlling an operation of the image display device according to a second exemplary embodiment of the present disclosure. The method of FIG. 6 may be performed by the devices shown in FIGS. 1-4A.

With reference to FIG. 6, the image display device may receive an image from the mobile terminal 100 through the interface unit 230 (step S410). The received image (the entire area 400) may include items of image characteristic information. For example, the entire area 400 may include a moving image and a still image.

The controller 212 may extract an area (a first area 410) including a moving image and an area (a second area 420) including a still image (step S420).

In the second exemplary embodiment of the present disclosure, the controller 212 may detect the first area 410 and extract a remaining area, excluding the first area 410, of the received image, as a second area 420.

Also, in the second exemplary embodiment of the present disclosure, the controller 212 may detect the still image and divide the image into the first area 410 and the second area 420. Various methods for extracting the first area 410 and the second area 420 may be applicable to an embodiment of the present disclosure.

Also, in the second exemplary embodiment of the present disclosure, the second area 420 does not change over time, so the image display device 200 may receive only the image corresponding to the first area 410 of the entire area 400 from the mobile terminal 100, thus reducing the network traffic.

Accordingly, the controller 212 may request a continuous transmission of the image with respect to the first area 410 from the mobile terminal 100 (step S430). IN this case, the interface unit 230 may receive an image in response to the request from the mobile terminal 100 (step S450).

Also, in the second exemplary embodiment of the present disclosure, in order for the interface unit 230 to receive only the image with respect to the first area 410 of the entire area 400 from the mobile terminal 100, interruption of the transmission of the image with respect to the second area 420 may be requested from the mobile terminal 100.

Also, in the second exemplary embodiment of the present disclosure, the controller 212 may store the image with respect to the second area 420 in the memory 212 (step S440). The controller 212 may control the display unit 201 to display the image with respect to the first area 410 and the image with respect to the second area 420 (step S460).

Also, in the second exemplary embodiment of the present disclosure, the controller 212 may receive only the image with respect to the first area 410 of the entire area 400 from the mobile terminal 100 on the basis of a certain reference. For example, the certain reference may be a case in which the image corresponding to the first area 410 uniformly changes during a time interval of a threshold time or greater.

Also, in the second exemplary embodiment of the present disclosure, the controller 212 may periodically check a temporal variation of the image with respect to the first area 410. As a result, the controller 212 may control the interface unit 230 to receive only the image with respect to the first area 410 of the entire area 400 only when the image corresponding to the first area 410 corresponds with the certain reference, thus effectively processing the image corresponding to the first area 410.

Also, in the second exemplary embodiment of the present disclosure, the controller 212 may periodically determine whether to process the received image on the basis of the image processing scheme. For example, the controller 212 may periodically check a change in the state of the image with respect to the first area 410 or the second area 420 and determine whether to process the received image on the basis of the image processing scheme.

Also, in the second exemplary embodiment of the present disclosure, when a change in the image with respect to the first area 410 or the second area 420 is detected, the controller 212 may determine whether to process the received image on the basis of the image processing scheme. Such an operation of the controller 212 may serves to increase the efficiency of the image processing scheme.

Third Embodiment

Figure 7A:
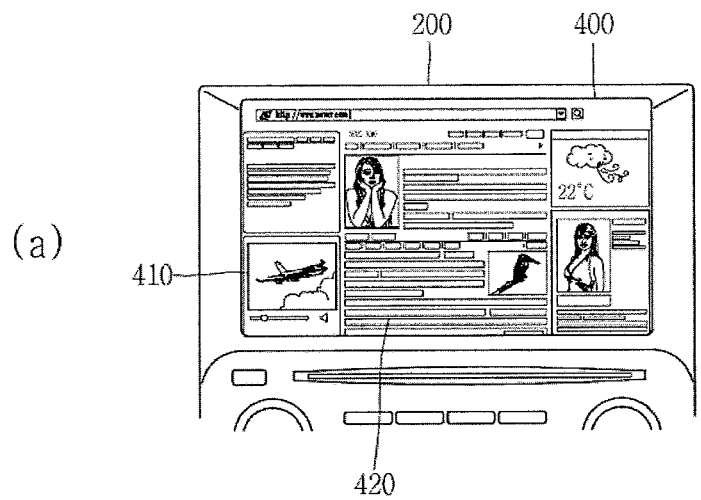
FIG. 7A is a view showing a process of controlling an operation of the image display device according to a third exemplary embodiment of the present disclosure.
Figure 7A:
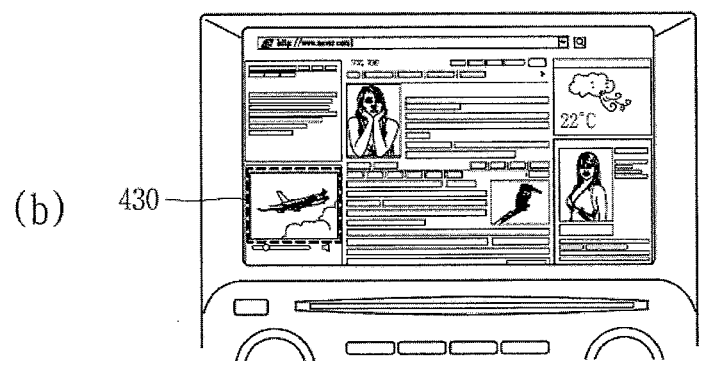
Figure 7A:
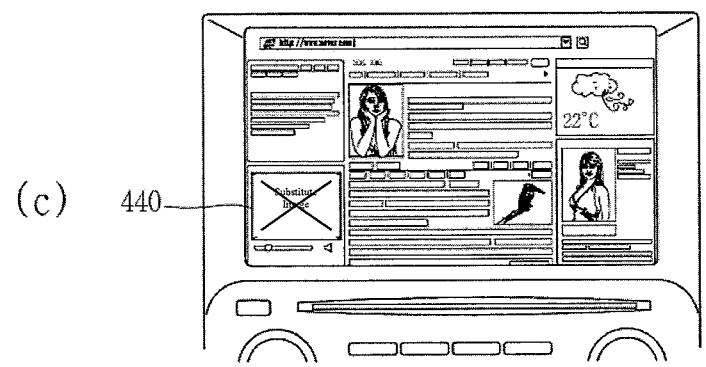

FIG. 7A is a view showing the process of controlling an operation of the image display device according to a third exemplary embodiment of the present disclosure. The process of FIG. 7A may be performed by the devices shown in FIGS. 1-4A.

With reference to FIG. 7A, the controller may extract the area (the first area 410) including the moving image (See FIG. 7A(a)). The extracted first area 430 is displayed in FIG. 7A(b).

In the third exemplary embodiment of the present disclosure, in order to prevent the driver (or user) from being interfered with while he is driving, a certain travel regulation may be made. For example, when the speed of the vehicle is a certain speed (e.g., five miles (8 kilometers) an hour) or higher, the controller 212 may lock out the moving image area to prevent the driver from viewing the moving image.

For example, the controller 212 may use the speed sensed by the speed sensor 225c as the speed of the vehicle. Also, the controller 212 may calculate a location variation (or distance) per unit hour by using location information received from the GPS module 207 to recognize the speed of the vehicle. Various speed detection methods can be applicable to an embodiment of the present disclosure.

Thus, the controller 212 may determine whether the status of the vehicle corresponds with the travel regulation conditions, and change the image with respect to the first area 410 with a substitute image 440 on the basis of the determination results. The changing into the substitute image 440 may serves as the lock-out.

The substitute image 440 may be a certain image in a broad sense in order to prevent the driver (or user) from being interfered with while he is driving. For example, the substitute image 440 may be a full image in black. Also, the substitute image 440 may include an X shape formed by two diagonal straight lines. Various substitute images can be applicable to an embodiment of the present disclosure.

Various travel regulation conditions can be applicable to an embodiment of the present disclosure.

Figure 7B:
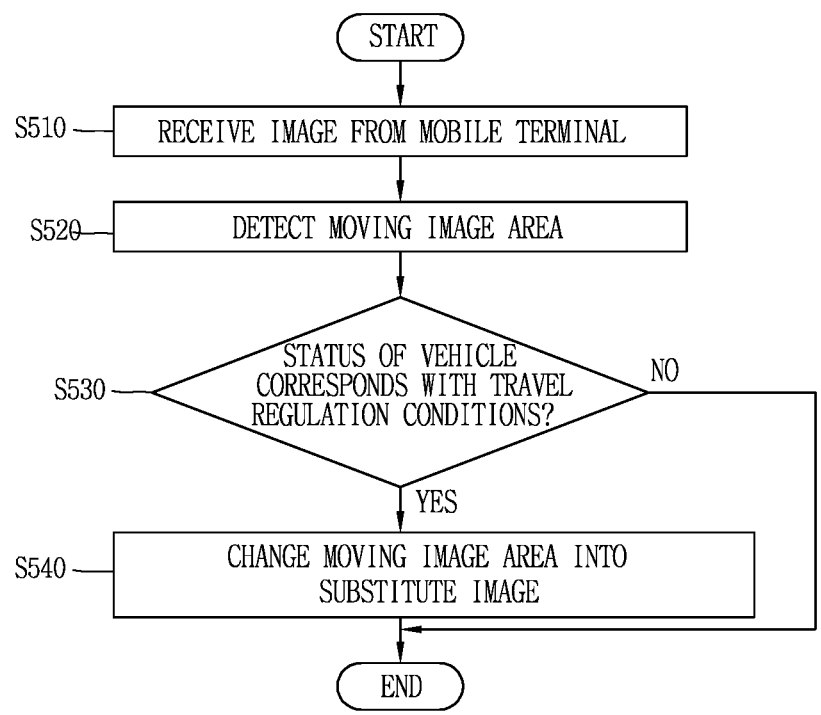
FIG. 7B is a flow chart illustrating the process of controlling an operation of the image display device according to the third exemplary embodiment of the present disclosure.

FIG. 7B is a flow chart illustrating the process of controlling an operation of the image display device according to the third exemplary embodiment of the present disclosure.

With reference to FIG. 7B, the image display device 200 may receive an image from the mobile terminal 100 through the interface unit 230 (step S510). The controller 212 may extract the area (first area 410) including a moving image from the received image (step S520).

In the third exemplary embodiment of the present disclosure, the controller 212 may determine whether or not the status of the vehicle corresponds with the travel regulation conditions (step S530). When the status of the vehicle corresponds with the travel regulation conditions, the controller 212 may change the image corresponding to the first image with a substitute image 440 on the basis of the determination results (step S540).

When the image corresponding to the first area 410 is changed to the substitute image 440 or when the status of the vehicle does not correspond with the travel regulation conditions, the controlling process of the operation of the image display device 200 is terminated.

Fourth Embodiment

Figure 8A:
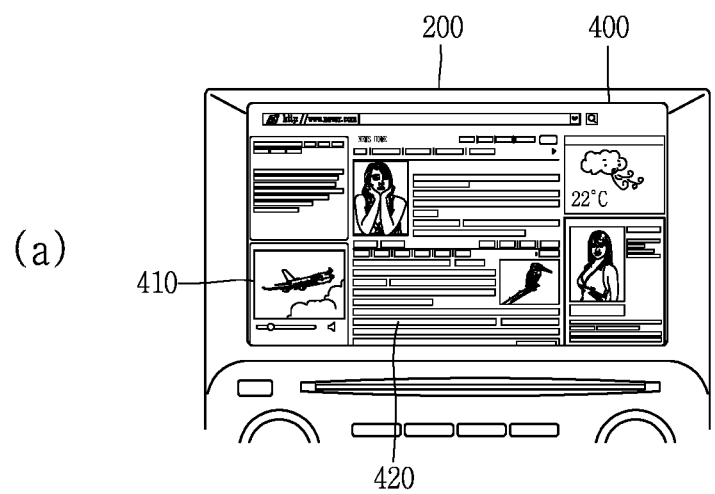
FIG. 8A is a view showing a process of controlling an operation of the image display device according to a fourth exemplary embodiment of the present disclosure.
Figure 8A:
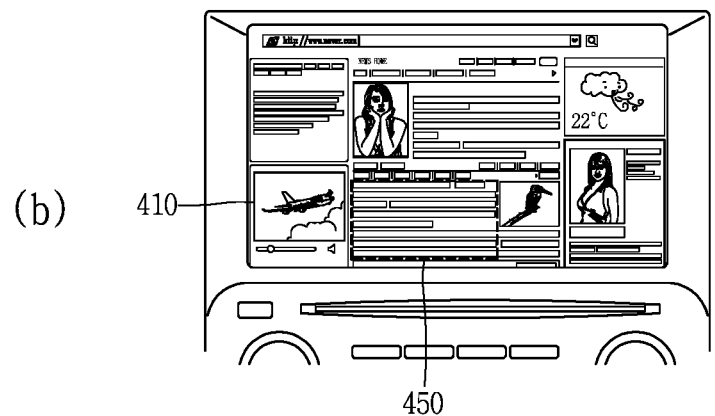
Figure 8A:
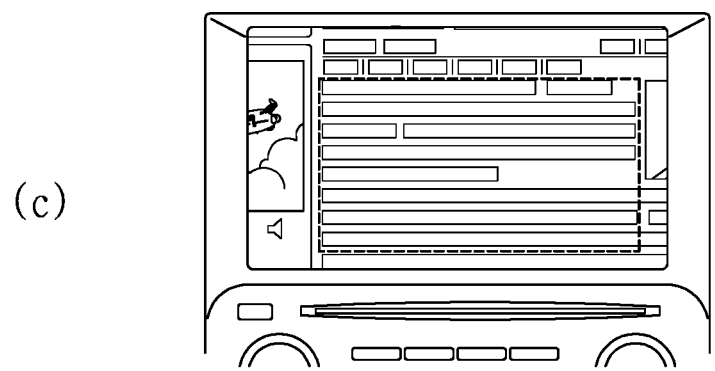

FIG. 8A is a view showing a process of controlling an operation of the image display device according to a fourth exemplary embodiment of the present disclosure. The process of FIG. 8A may be performed by the devices shown in FIGS. 1-4A.

With reference to FIG. 8A, the controller 212 may extract an area (second area 420) including text. The extracted second area 450 is illustrated in FIG. 8A(b).

In the fourth exemplary embodiment of the present disclosure, there may be various methods for extracting the area including the text. For example, the controller 212 may extract a text vector to recognize the shape of the text and compare the text vector with a reference vector to detect whether or not a particular area includes text. Alternatively, the controller 212 may extract the area based on a user selection, such as a touch or drag to the touch screen.

Also, there may be various schemes for detecting text of a particular area. In the fourth exemplary embodiment, there may be an optical character recognition (OCR), a technique for automatically recognizing text included in a document. Various schemes for detecting an area including text may be applicable to an embodiment of the present disclosure.

Also, in the fourth exemplary embodiment of the present disclosure, when the second area 420 is extracted, the controller 212 extracts the size of the text included in the second area 420. The size of the text may be a size of the shape of a letter in a broad sense. Thus, the size of the text may be a size of the font. Also, the size of the text may indicate the size of the area including the text.

The detection of the size of the text may be similar to a scheme of extracting the second area 420, and the text may be extracted in the process of extracting the second area 420. Various schemes of detecting the size of the text can be applicable to an embodiment of the present disclosure.

Also, in the fourth exemplary embodiment of the present disclosure, the controller 212 may compare the detected size of the text with a reference size.

Also, in the fourth exemplary embodiment of the present disclosure, the controller 212 may control the display unit 201 to magnify or reduce the second area 420 and display the same. For example, when the extracted size of the text is smaller than the reference size, the controller 212 may magnify the second area 420 to have a predetermined size. Also, in an exemplary embodiment of the present disclosure, the controller 212 may change the image with respect to the second area to have a predetermined resolution and may change the image to have a predetermined resolution when the size of the text is magnified to have a predetermined size.

In FIG. 8A, the size of the text included in the second area 420 is smaller than the reference size, so the second area 420 is magnified (FIG. 8A(c)).

Figure 8B:
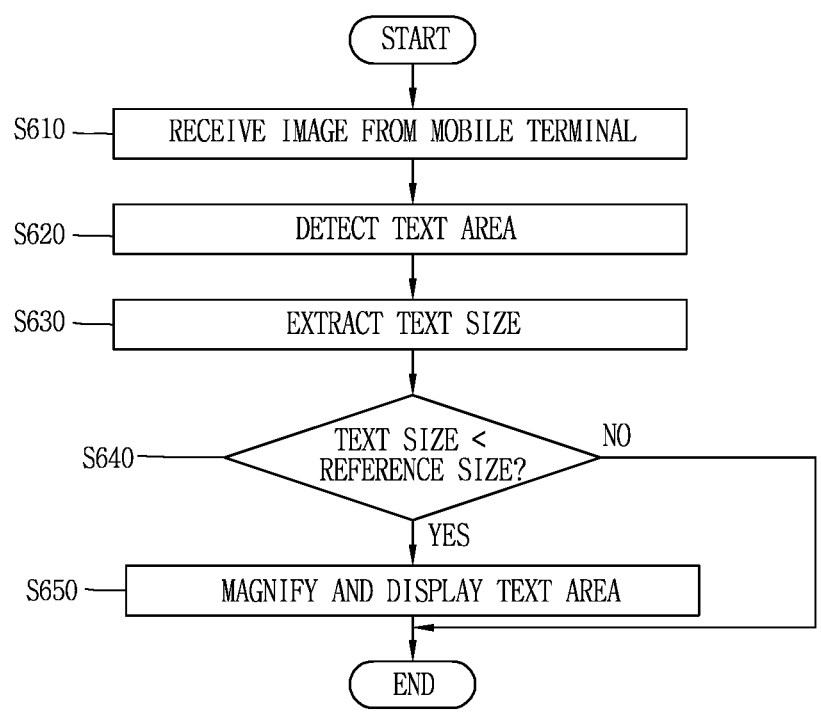
FIG. 8B is a flow chart illustrating the process of controlling an operation of the image display device according to the fourth exemplary embodiment of the present disclosure.

FIG. 8B is a flow chart illustrating the process for controlling an operation of the image display device according to the fourth exemplary embodiment of the present disclosure. The method of FIG. 8B may be performed by the devices shown in FIGS. 1-4A.

With reference to FIG. 8B, the image display device 200 may receive an image from the mobile terminal 100 thorough the interface unit 230 (step S610). The controller 212 may detect an area (second area 420) including text from the received image (step S620).

In the fourth exemplary embodiment of the present disclosure, the controller 212 may extract the size of the text in the detected second area 420. Also, the controller 212 may compare the extracted size of the text with a reference size (step S640).

Also, in the fourth exemplary embodiment of the present disclosure, when the extracted size of the text is smaller than the reference size on the basis of the comparison results, the controller 212 may magnify the second area 420 to have a predetermined size (step S650). When the second area 420 is magnified or when the extracted size of the text is greater than the reference size, the process for controlling the operation of the image display device 200 is terminated. Besides, when the extracted size of the text is greater than the reference size, the process of controlling the operation of the image display device 200 for reducing the second area 420 can be applicable to an embodiment of the present disclosure.

Also, in the fourth exemplary embodiment of the present disclosure, when the extracted size of the text is smaller than a first reference size, the controller 212 magnifies the second area 420, and when the extracted size of the text is greater than a second reference size, the controller 212 may reduce the second area 420.

Also, in the fourth exemplary embodiment of the present disclosure, the first and second reference sizes may be set to have different values. The process of controlling the operation of the image display device using various text comparing methods and scaling schemes is applicable to an embodiment of the present disclosure.

Fifth Embodiment

Figure 9:
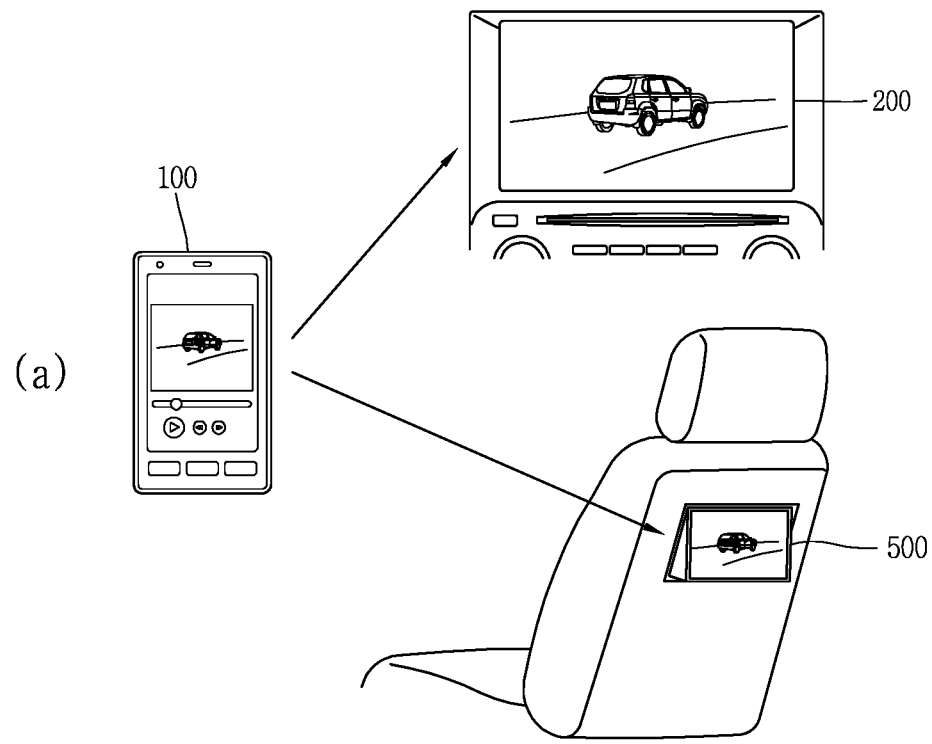
FIG. 9 is a view showing a process of controlling an operation of the image display device according to a fifth exemplary embodiment of the present disclosure.
Figure 9:
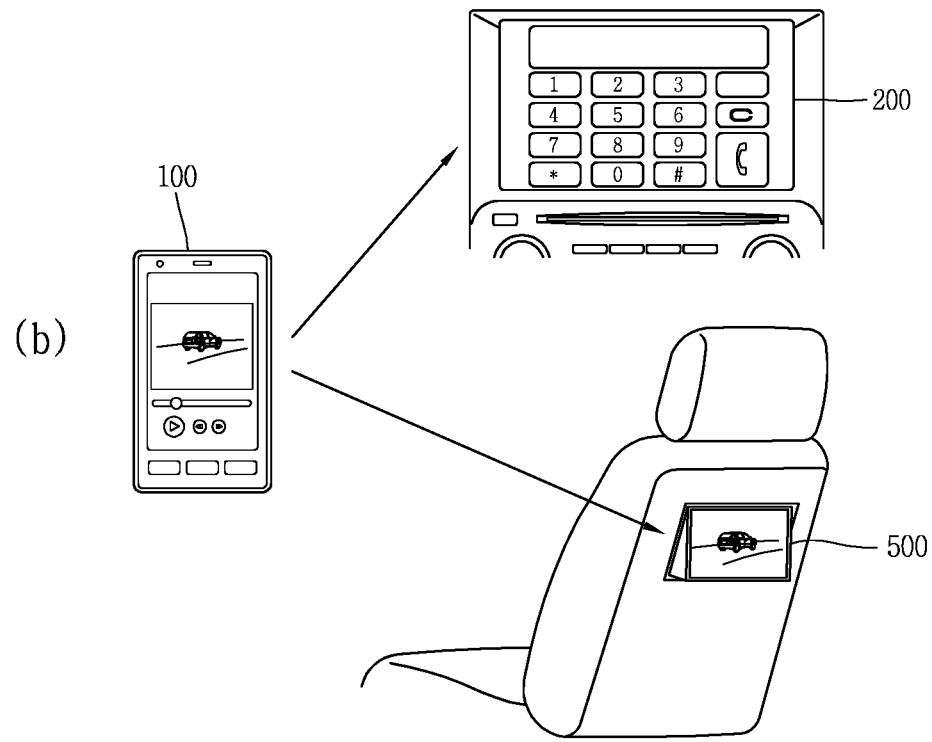

FIG. 9 is a view showing a process of controlling an operation of the mobile terminal according to a fifth exemplary embodiment of the present disclosure. The process of FIG. 9 may be performed by the devices shown in FIGS. 1-4A.

With reference to FIG. 9, a first image display device 200 receives an image from the mobile terminal 100 that is connected through a fixed line or wirelessly and display the received image on its screen.

In the fifth exemplary embodiment, the image may be displayed on the screen by a second image display device 500 installed at a different position (or other seat) in the vehicle.

Also, in the fifth exemplary embodiment of the present disclosure, the multi-screen function may be implemented, for example, by an N-screen. The N-screen refers to a system of using a common service by various terminals (e.g., a table PC, a notebook computer, a smartphone, or the like) equipped with a common operating system.

In the fifth exemplary embodiment, when the mobile terminal 100 is connected to the first image display device 200 and a certain application is being executed, the first image display device 200 and the second image display device 500 may display an image related to the execution of the application.

In general, when the mobile terminal 100 receives an incoming call while executing the application, the screen of the mobile terminal 100 may be changed to a call screen.

However, in the fifth exemplary embodiment of the present disclosure, when the mobile terminal 100 is connected to the first image display device, although the mobile terminal 100 receives the incoming call, the mobile terminal 100 can continuously display the image with respect to the executed application.

In the fifth exemplary embodiment, the second image display device 500 can continuously display the image with respect to the application, and continuously controls the operation of the mobile terminal.

Also, in the fifth exemplary embodiment of the present disclosure, the controller 180 of the mobile terminal 100 may control the communication unit to transmit a signal indicating that the incoming call has been received to the image display device mounted in the vehicle. When the mobile terminal 100 receives the incoming call, the image of the first image display device 200 may be changed to a hands free screen image.

Sixth Embodiment

Figure 10:
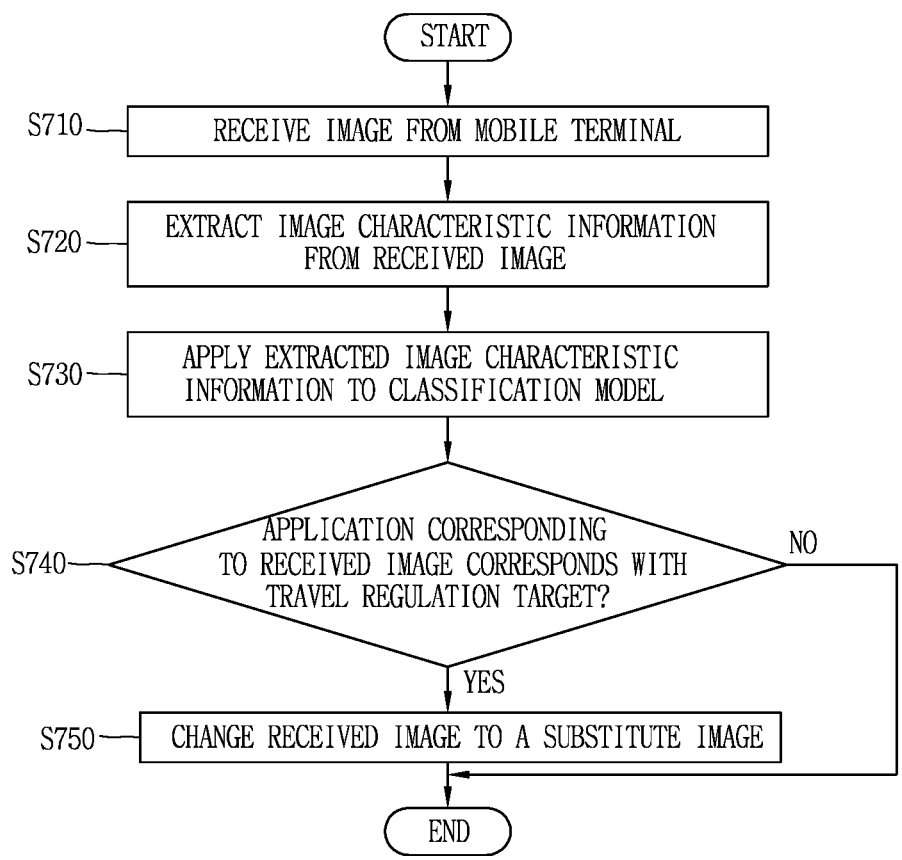
FIG. 10 is a flow chart illustrating the process of controlling an operation of the image display device according to a sixth exemplary embodiment of the present disclosure.

FIG. 10 is a flow chart illustrating the process of controlling an operation of the image display device according to a sixth exemplary embodiment of the present disclosure. The method of FIG. 10 may be performed by the devices shown in FIGS. 1-4A.

In the sixth exemplary embodiment of the present invention, the controller 212 may determine whether or not the type of the application being executed in the process of controlling the operation of the image display device 200 is a travel regulation target.

Also, in the sixth exemplary embodiment of the present disclosure, when the application is a travel regulation target on the basis of the determination results, the controller 212 may change the image received from the mobile terminal 100 to a substitute image.

For example, when the image with respect to the application being executed is a moving image related to movie, since the moving image have a possibility of interfering with the driver (user) who is driving, the controller 212 may change the moving image to a substitute image. For example, when the application being executed is a navigation application, since the image is not a travel regulation target, the controller may continuously display the image with respect to the application Also, in the sixth exemplary embodiment of the present disclosure, in determining whether or not the application being executed is a travel regulation target, the controller 212 may determine whether or not the application being executed is a travel regulation target on the basis of a classification model with respect to the application.

Also, in the sixth exemplary embodiment of the present disclosure, the classification model may be used as an index for determining whether or not to which application the image currently received form the mobile terminal 100 corresponds.

Also, in the sixth exemplary embodiment of the present disclosure, the index may be a sort of function in which certain information is input and results obtained by discriminating the type of the application are output.

Also, in the sixth exemplary embodiment of the present disclosure, the sort of function may be a certain mathematical model. Fro example, the certain mathematical model may be an n-dimensional equation. Various classification models for determining the type of the application is applicable to an embodiment of the present disclosure.

Also, in the sixth exemplary embodiment of the present disclosure, in generating the classification mode, a machine learning algorithm may be used.

Also, in the sixth exemplary embodiment of the present disclosure, the classification model may be generated on the basis of certain learning data, and in detail, image characteristic information may be extracted from the learning data and the machine learning algorithm is performed by using the image characteristic information.

Also, in the sixth exemplary embodiment of the present disclosure, in order to determine whether or not the application is a navigation application, the controller 212 may collect image data of various types of navigation applications. The collected image data may be learning data.

Also, in the sixth exemplary embodiment of the present disclosure, the image characteristic information may be the color of a road, the number of straight lines, the color and shape information of road guide milestone, or the like.

Also, in the sixth exemplary embodiment of the present disclosure, when the image characteristic information is determined, since an output employing the classification model is a navigation output, a mathematical model for determining the type of the application being executed may be generated by using the image characteristic information.

Known as the machine learning algorithm includes an SVM (Support Vector Machine), an ANN (Artificial Neutral Network), or the like.

The SVM refers to a map learning method using a statistics classification and regression analysis. SVM applies a technique of a linear classification to a nonlinear classification problem by using a kernel trick.

The SVM refers to one of learning models having the most excellent recognition performance among the numerous schemes known so far. The reason for the SVM to exhibit the excellent recognition performance is because SVM includes a scheme for obtaining a high recognition performance with respect to non-learning data.

The SVM is uses a linear threshold element and configures a 2-class pattern recognizer. A parameter of a linear threshold element is learned on the basis of the reference called a margin maximization from a training sample.

The ANN is a mathematical model aiming at expressing the some characteristics of a brain function by a computer simulation. ANN is also called a neural network, and when ANN is strictly discriminated from biology or a brain science, 'artificial' is attached in front of the acronym.

The ANN generally refers to a model having a problem solving capability by changing a coupling strength of synapses through learning of an artificial neuron (node) forming a network by coupling the synapses. In a narrow sense, the ANN may indicate a multi-layer perception using an error back-propagation method, but the ANN is not limited thereto.

The ANN includes supervised learning optimized for a problem by inputting a supervising signal (correct answer) and unsupervised learning which does not require a supervising signal. When there is a clear solution, the supervised learning is used, and the unsupervised learning is used for data clustering. Resultantly, in order to reduce every dimension, a good reply may be obtained with a relatively small amount of calculation with respect to a problem which cannot be linearly separated, by multi-dimensional data such as an image, statistics, or the like. Thus, ANN is applied in various fields, such as a pattern recognition, data mining, or the like.

Also, in the sixth exemplary embodiment of the present disclosure, the controller 212 determines the type of an application being currently execute on the basis of the classification model.

Also, in the sixth exemplary embodiment of the present disclosure, the controller 212 extracts the image characteristic information from the image received from the mobile terminal 100. In this case, the controller 212 inputs the image characteristic information to the classification mode.

Also, in the sixth exemplary embodiment of the present disclosure, the controller 212 determines the type of an application with a certain value obtained from the mathematical model by inputting the image characteristic information to the mathematical model included in the classification model. When the type of the application is a travel regulation target according to the result of the application to the classification model, the controller 212 may change the received image to the substitute image, and in this case, the controller 212 continuously displays the received image.

Also, in the sixth exemplary embodiment of the present disclosure, the controller 212 may perform the process of controlling the operation of the image display device 200 on the basis of the predetermined classification mode.

Also, in the sixth exemplary embodiment of the present disclosure, the predetermined classification mode may be obtained in advance through the machine learning algorithm and stored in the memory 213 of the image display device 200.

Also, in the sixth exemplary embodiment of the present disclosure, the controller 212 may perform the process of controlling the operation of the image display device 200 on the basis of the classification model which is continuously updated while the image display device 200 is operating.

Another method for updating a classification mode is an incremental learning algorithm.

Also, in the sixth exemplary embodiment of the present disclosure, although the application being executed is navigation when the image display device 200 determines that the application is a travel regulation target and changes the received image to a substitute image, the driver (or user) may input information indicating that the application is navigation to the image display device. The controller may correct the classification model and may control the image display device 200 to be properly operated.

With reference to FIG. 10B, the image display device 200 may receive an image from the mobile terminal 100 through the interface unit 230 (step S710). The controller 212 may extract image characteristic information from the received image (step S720).

The controller 212 may apply the extracted image characteristic information to a classification model (step S730). The controller may determine whether or not the application corresponding to the received image a travel regulation target on the basis of the application results (step S740).

When the application is a travel regulation target, the controller 212 may change the received image to a substitute image 440 (step S750). When the received image is changed to the substitute image 440 or when the application odes not correspond with the travel regulation conditions, the process of controlling the operation of the image display device 200 is terminated.

Meanwhile, the method for controlling the operation of the image display device according to an exemplary embodiment of the present disclosure can be implemented as codes that can be read by a processor in a program-recorded medium. The processor-readable recording medium may include a ROM, a RAM, a CD-ROM, a magnetic tape, a floppy disk, an optical data storage device, and the like. The processor-readable recording medium also includes implementations in the form of carrier waves or signals (e.g., transmission via the Internet). Also, codes which are distributed in computer devices connected by a network and can be read by a computer in a distributed manner are stored and executed in the processor-readable recording medium.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A display system configured to be installed in a vehicle, the display system comprising:
   a communication unit configured to receive data from a mobile terminal located within the vehicle;
   a first display unit operatively connected to the communication unit and configured to be installed in a first position in the vehicle, the first display unit configured to display the data;
   a second display unit operatively connected to the communication unit and configured to be installed in a second position in the vehicle different than the first position, the second display unit configured to display the data; and
   a controller configured to change the display of the data on the first display unit while the mobile terminal processes an incoming or outgoing event, and
   wherein the second display unit is configured to continue to display the data while the mobile terminal processes the incoming or outgoing event.

2. The display system of claim 1, wherein the controller is configured to change the display of the data on the first display unit by one of
   freezing the display at an image or frame displayed when the mobile terminal begins to process the incoming or outgoing event;
   replacing the streamed data with a predetermined image; or
   overlaying an image on the data.

3. The display system of claim 2, wherein the replacing of the data with the predetermined image includes at least one of displaying a call screen image and displaying an entire image that is black.

4. The display system of claim 2, wherein the overlaying of the image on the data includes displaying an X shape formed by two diagonal straight lines on the image.

5. The display system of claim 1, wherein the first display unit is configured to output video or audio data related to the incoming or outgoing event while the display of the data is changed.

6. The display system of claim 1, wherein the event includes a call.

7. The display system of claim 1, wherein the data includes streamed data received from the mobile terminal.

8. The display system of claim 1, wherein the data includes at least one of a still image, a moving image, and text.

* * * * *